United States Patent
Zhu et al.

(10) Patent No.: US 8,983,968 B2
(45) Date of Patent: Mar. 17, 2015

(54) METHOD FOR PROCESSING DUPLICATED DATA

(75) Inventors: Ming-Sheng Zhu, Tianjin (CN); Chih-Feng Chen, Taipei (JP)

(73) Assignee: Inventec Corporation, Taipei (TW)

( * ) Notice: Subject to any disclaimer, the term of this patent is extended or adjusted under 35 U.S.C. 154(b) by 680 days.

(21) Appl. No.: 13/240,154

(22) Filed: Sep. 22, 2011

(65) Prior Publication Data

US 2012/0310974 A1 Dec. 6, 2012

(30) Foreign Application Priority Data

Jun. 1, 2011 (CN) .......................... 2011 1 0157707

(51) Int. Cl.
*G06F 17/30* (2006.01)
*G06F 11/14* (2006.01)

(52) U.S. Cl.
CPC ........ *G06F 11/1453* (2013.01); *G06F 17/3015* (2013.01); *G06F 17/30109* (2013.01); *G06F 2201/83* (2013.01)
USPC ...................................................... 707/747

(58) Field of Classification Search
CPC . G06F 17/30743; G06F 21/32; G06F 12/108; G06F 17/30109; G06F 17/3033
USPC .................. 707/791, 752, 715, 718, 728, 779
See application file for complete search history.

(56) References Cited

U.S. PATENT DOCUMENTS

| | | | |
|---|---|---|---|
| 7,950,751 B2 * | 5/2011 | Offerle et al. ................. 303/193 |
| 7,952,751 B2 * | 5/2011 | Silverbrook et al. .......... 358/1.8 |
| 8,069,151 B1 * | 11/2011 | Crafford et al. ............... 707/674 |
| 2002/0122543 A1 * | 9/2002 | Rowen ........................ 379/93.01 |
| 2008/0215474 A1 * | 9/2008 | Graham .......................... 705/37 |
| 2011/0010560 A1 * | 1/2011 | Etchegoyen .................. 713/189 |
| 2011/0225191 A1 * | 9/2011 | Xie ............................... 707/775 |
| 2012/0166401 A1 * | 6/2012 | Li et al. ........................ 707/692 |

* cited by examiner

*Primary Examiner* — James Trujillo
*Assistant Examiner* — Fatima Mina
(74) *Attorney, Agent, or Firm* — Morris Manning & Martin LLP; Tim Tingkang Xia, Esq.

(57) ABSTRACT

A processing method for duplicated data includes the following steps. A query request is received from a client, in which the query request includes a requested fingerprint value. A hash tank corresponding to the requested fingerprint value in a memory is searched for the requested fingerprint value. When the requested fingerprint value does not exist in the hash tank corresponding to the requested fingerprint value, the following steps are executed. An addition table in the memory is searched for the requested fingerprint value; and when the requested fingerprint value exists in the addition table, an invalid duplicate message is sent to the client.

7 Claims, 6 Drawing Sheets

METHOD FOR PROCESSING DUPLICATED DATA

CROSS-REFERENCE TO RELATED APPLICATIONS

This non-provisional application claims priority under 35 U.S.C. §119(a) on Patent Application No. 201110157707.X filed in China, P. R. C. on Jun. 1, 2011, the entire contents of which are hereby incorporated by reference.

BACKGROUND OF THE INVENTION

1. Field of the Invention

The present invention relates to a method for processing duplicated data, and more particularly to a method for determining whether duplicated data exists.

2. Related Art

Data de-duplication is a data reduction technology and generally used for a disk-based backup system for the main purpose of reducing storage capacity used in a storage system. A working mode of the data de-duplication is searching for duplicated tanks of viable sizes at different locations in different files within a certain period of time. The duplicated tanks may be replaced with an indicator. A large quantity of redundant data always exists in the storage system. A de-duplication technology can be adopted to reduce stored data to ½₀ of the original stored data, so as to obtain more backup space.

Data to be stored is stored in a server, so a client needs to transport data confirmed as unduplicated to the server. When the server confirms the data as the unduplicated new data, the server first registers a fingerprint value of new data and then receives and stores the new data. Different clients may correspond to the same data, so more backup space can be conserved. However, in a multi-client system, when one client is adding and transmitting new backup data, other clients may intend to query whether the same backup data is duplicated. In this way, other clients may consider that the duplicated data exists but cannot find the corresponding duplicated data. Especially, when addition fails since new data being added is faulty, but other clients discard own data, the addition completely and irremediably fails.

SUMMARY OF THE INVENTION

The present invention is a method for processing duplicated data. According to an embodiment, the method for processing the duplicated data comprises the following steps. A query request is received from a client, in which the query request comprises a requested fingerprint value. A hash tank corresponding to the requested fingerprint value in a memory is searched for the requested fingerprint value. The following steps are executed when the requested fingerprint value does not exist in the hash tank corresponding to the requested fingerprint value. An addition table in the memory is searched for the requested fingerprint value; and an invalid duplicate message is sent to the client, when the requested fingerprint value exists in the addition table.

According to another embodiment, the method for processing the duplicated data comprises the following steps. A query request is received from a client. A requested fingerprint value is processed by employing a Bloom filter and a return value is obtained. A hash tank corresponding to the requested fingerprint value in a memory is searched for the requested fingerprint value, when the return value is hit. The following steps are executed, when the requested fingerprint value does not exist in the hash tank corresponding to the requested fingerprint value. An addition table in the memory is searched for the requested fingerprint value; and an invalid duplicate message is sent to the client, when the requested fingerprint value exists in the addition table.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The detailed features and advantages of the present invention are described below in great detail through the following embodiments, the content of the detailed description is sufficient for those skilled in the art to understand the technical content of the present invention and to implement the present invention there accordingly. Based upon the content of the specification, the claims, and the drawings, those skilled in the art can easily understand the relevant objectives and advantages of the present invention.

The present invention relates to a method for processing duplicated data, applicable to a server. The server implementing the method for processing the duplicated data can determine whether data to be backed up by at least one client is duplicated, so as to provide a data de-duplication function.

Figure 1:
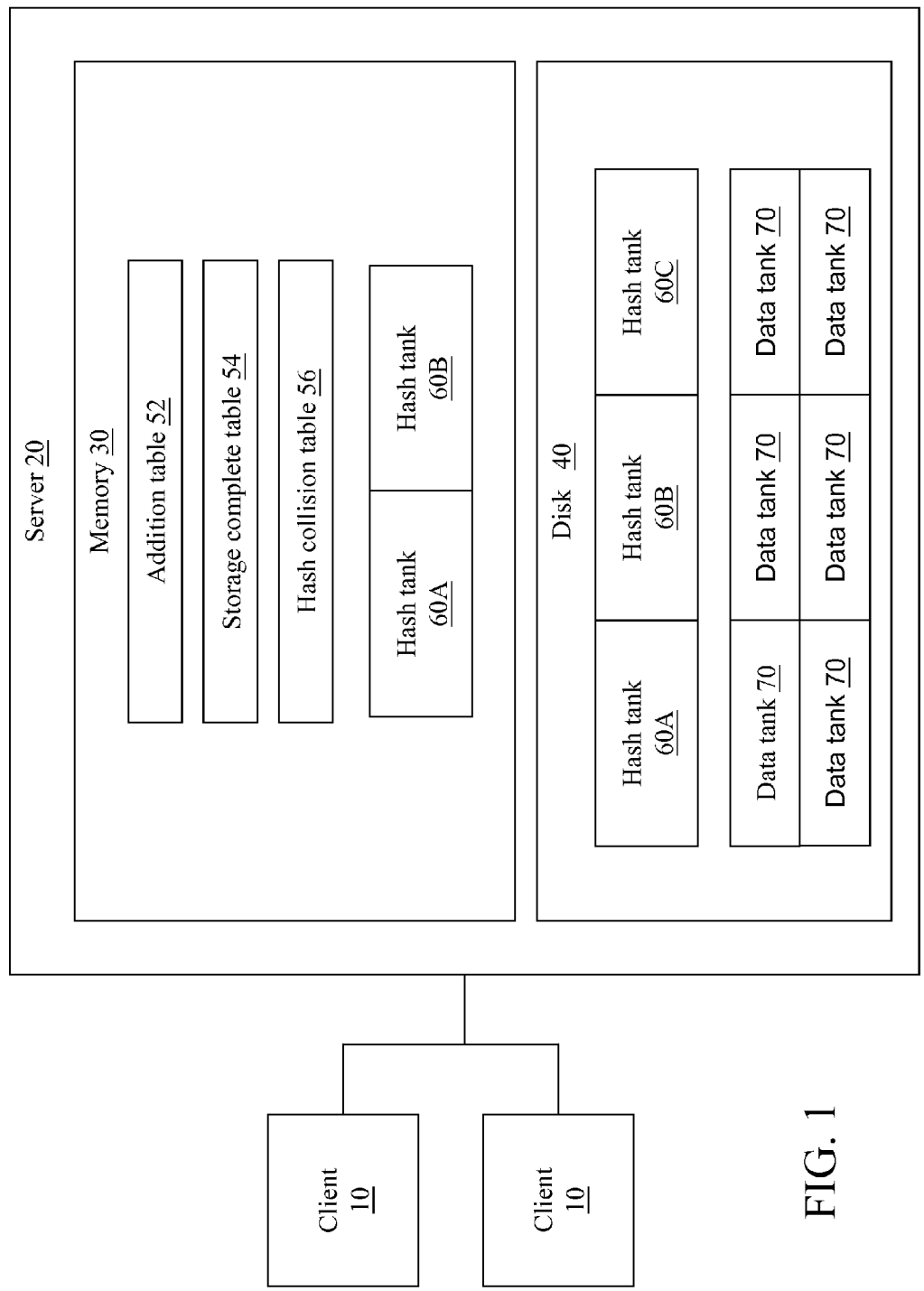
FIG. 1 is a schematic diagram of a server according to an embodiment of the present invention.

FIG. 1 is a schematic diagram of a server according to an embodiment.

Referring to FIG. 1, the server 20 can be connected to a plurality of clients 10 through various networks, such as Internet or an internet and back up data transported by the clients 10. The server 20 may have hardware, such as a memory 30, a disk 40 and a processor. The disk 40 stores a plurality of data tank 70 completely received from the clients 10 and a plurality of hash tanks 60A, 60B and 60C (collectively called the hash tanks 60). The data tank 70 may be, for example, a text file, various multimedia files or a snapshot generated when the client 10 performs system backup, or may be a part of the files. For example, the server 20 may partition one file into a plurality of data tanks 70 each having a size of 2 MB and store the plurality of data tanks 70.

The server 20 can calculate a stored fingerprint value of each data tank 70 through an algorithm, such as message digest algorithm 5 (MD5), secure hash algorithm (SHA)-1, SHA-256, SHA-512 or one-way hash, and store a plurality of stored fingerprint values as the hash tanks 60 in the disk 40. When it is determined whether duplicated data exists, the hash tank 60 corresponding to the data tank 70 to be processed is loaded into the memory 30 from the disk 40 for processing.

An addition table 52, a storage complete table 54 and a hash collision table 56 can be maintained in the memory 30 in the server 20. The addition table 52 may record the stored fingerprint value of the data tank 70 being added. The storage complete table 54 may record the stored fingerprint value of the data tank 70 that is already added and into which addition complete information is not written. The hash collision table 56 may record the stored fingerprint value of each hash tank 60 generating hash collision.

Figure 2:
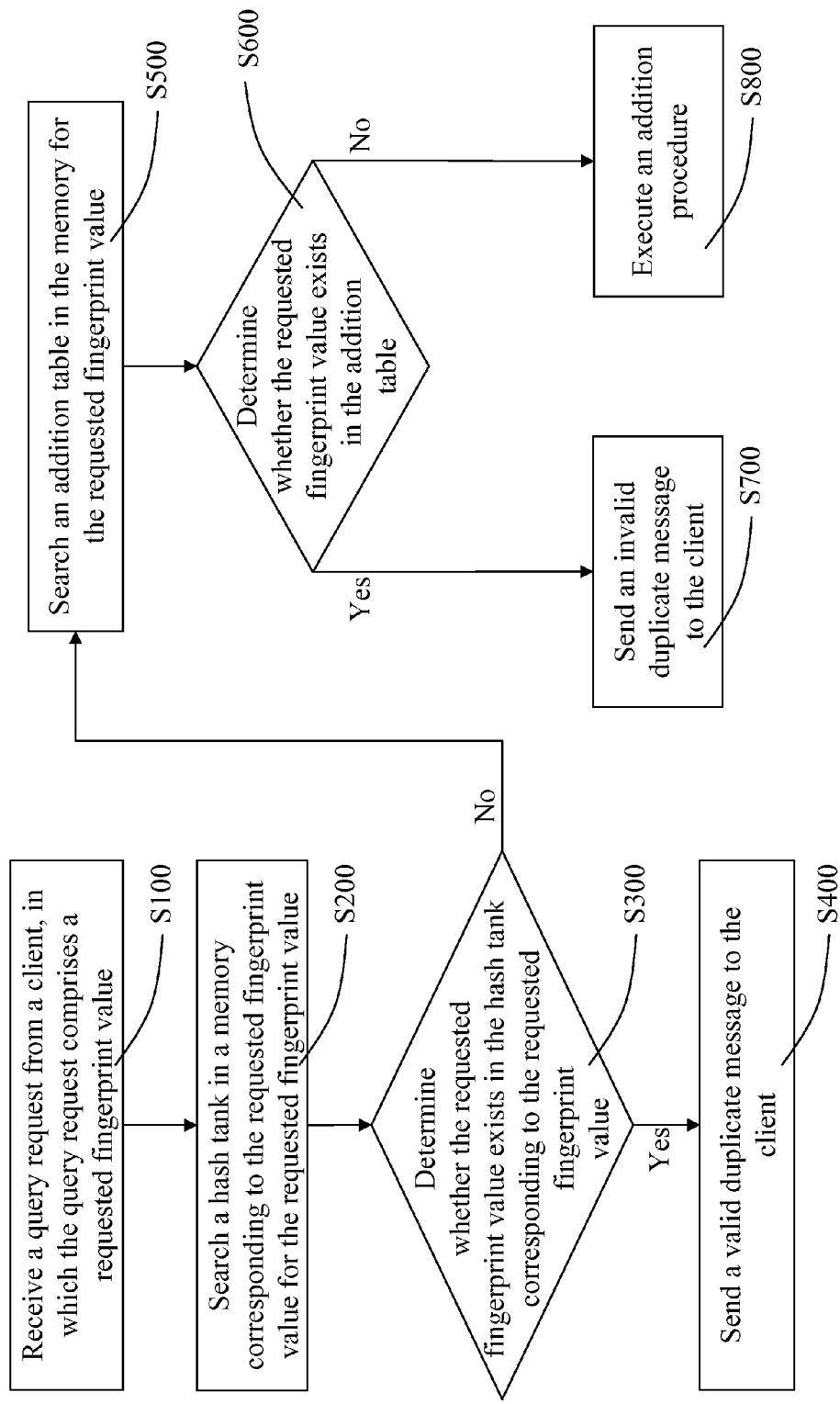
FIG. 2 is a flow chart of a method for processing duplicated data according to an embodiment of the present invention.

FIG. 2 is a flow chart of a method for processing duplicated data according to an embodiment of the present invention.

Referring to FIG. 2, first, a server 20 receives a query request from any client 10, in which the query request comprises a requested fingerprint value (Step S100). In order to reduce data transmission between the client 10 and the server 20 as much as possible, when the client 10 intends to back up a requested tank, the client 10 may only transport the requested fingerprint value representing the requested tank to the server 20. However, the algorithm for calculating the requested fingerprint value according to the requested tank must be the same as the algorithm for calculating a stored fingerprint value according to one data tank 70.

Figure 3:
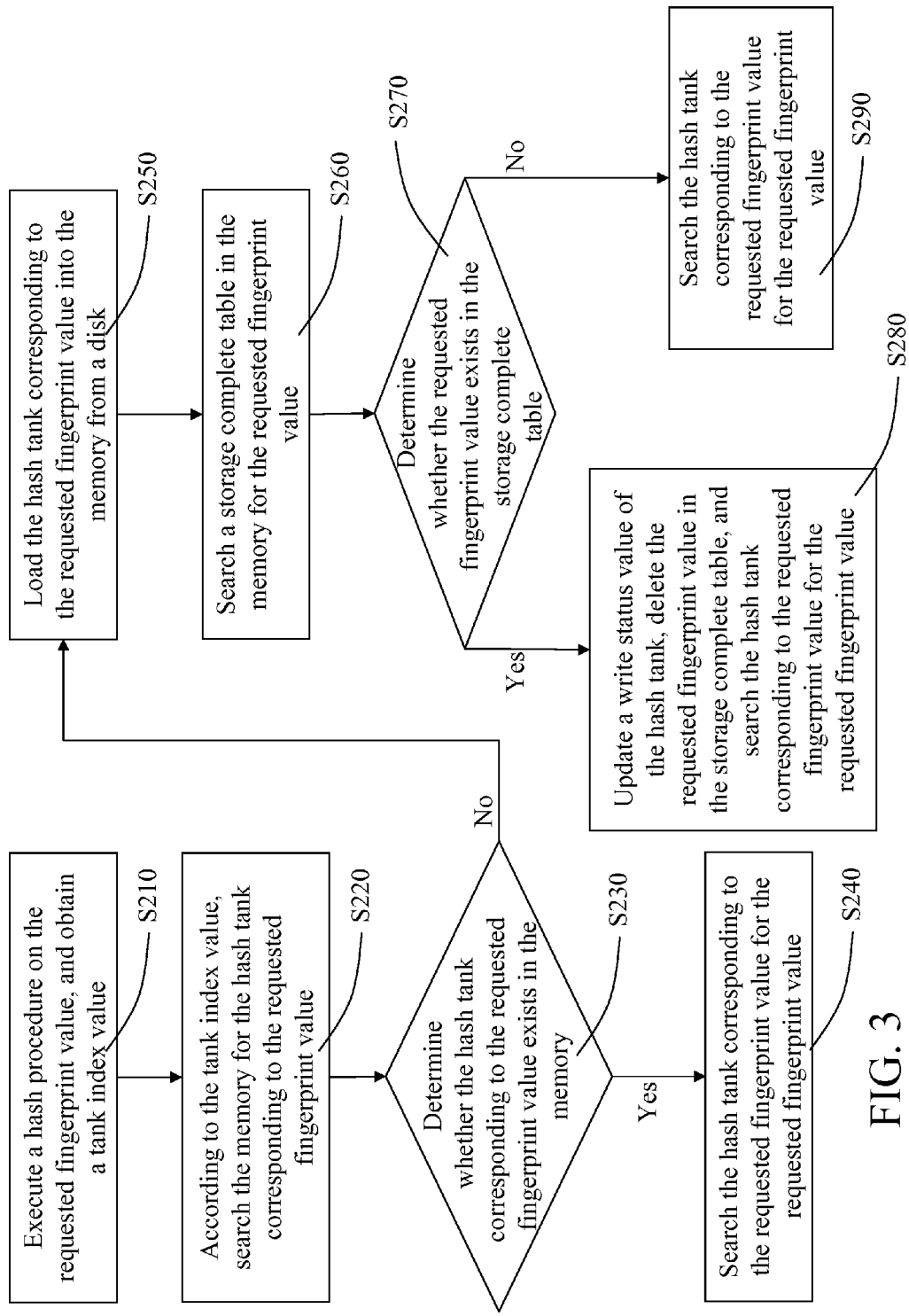
FIG. 3 is a flow chart of Step S200 according to an embodiment of the present invention.

Next, the server 20 searches a hash tank 60 in a memory 30 corresponding to the requested fingerprint value for the requested fingerprint value (Step S200), so as to determine whether the server 20 has the same data tank 70 as the requested tank. FIG. 3 is a flow chart of Step S200 according to an embodiment of the present invention.

The stored fingerprint value may be stored in a hash table, but since the number of the stored fingerprint values is large, not all the stored fingerprint values can be stored in the memory 30. Therefore, the server 20 can partition the hash table into a plurality of hash tanks 60 to quickly access the stored fingerprint values, but only a part of hash tanks 60 are loaded into the memory 30.

In order to determine whether the hash tank 60 possibly having the requested fingerprint value is in the memory 30, a hash procedure may be executed on the requested fingerprint value, and a tank index value is obtained (Step S210). Then, according to the tank index value, the memory 30 is searched for the hash tank 60 corresponding to the requested fingerprint value (Step S220), and it is determined whether the hash tank 60 corresponding to the requested fingerprint value exists in the memory 30 (Step S230).

For example, if the tank index value obtained after the hash procedure is executed on the requested fingerprint value is a hash tank 60A, the requested fingerprint value can be found in the memory 30. When the hash tank 60A corresponding to the requested fingerprint value exists in the memory 30, the hash tank 60A corresponding to the requested fingerprint value is searched for the requested fingerprint value (Step S240).

In contrast, if the tank index value obtained after the hash procedure is executed on the requested fingerprint value is a hash tank 60C, the requested fingerprint value cannot be found in the memory 30. When the hash tank 60C corresponding to the requested fingerprint value does not exist in the memory 30, Step 250 to Step 290 can be executed to search the required hash tank 60C for the requested fingerprint value.

The server 20 first loads the hash tank 60C corresponding to the requested fingerprint value into the memory 30 from a disk 40 (Step S250), and then searches a storage complete table 54 in the memory 30 for the requested fingerprint value (Step S260).

The storage complete table 54 may record the stored fingerprint value of the data tank 70 that is completely stored in the disk 40 and in which a write status value is not updated with addition complete information. In order to reduce the action (also known as disk input/output (IO)) of loading data in the disk 40 into the memory 30, when the data tank 70 is added completely, the stored fingerprint value of the data tank 70 added completely is registered in the storage complete table 54.

For example, if a new tank is added completely, but a hash tank 60 corresponding to the data tank 70 is not in the memory 30, the server 20 may not load the corresponding hash tank 60 into the memory 30 to update the write status value. In contrast, the server 20 stores the stored fingerprint value of the data tank 70 added completely in the storage complete table 54. The time spent on the disk IO is much longer than the time spent in directly reading and writing the memory 30, so the method for replacing the disk IO with the storage complete table 54 can conserve the time for processing the duplicated data.

The server 20 determines whether the requested fingerprint value exists in the storage complete table 54 (Step S270). When the requested fingerprint value exists in the storage complete table 54, the write status value of the hash tank 60 is updated, the requested fingerprint value in the storage complete table 54 is deleted, and the hash tank 60 corresponding to the requested fingerprint value is searched for the requested fingerprint value (Step S280). In other words, the server 20 updates the write status value only when the hash tank 60 of which the write status value is not updated needs to be loaded into the memory 30 (Step S200). In this way, the disk IO that the corresponding hash tank 60 is additionally loaded into the memory only for the purpose of updating the write status value can be avoided.

When the requested fingerprint value does not exist in the storage complete table 54, the hash tank 60 corresponding to the requested fingerprint value is directly searched for the requested fingerprint value (Step S290).

After reading and searching the required hash tank 60, the server 20 determines whether the requested fingerprint value exists in the hash tank 60 corresponding to the requested fingerprint value (Step S300). When the requested fingerprint value exists in the hash tank 60, a valid duplicate message is sent to the client 10 (Step S400). Since the stored fingerprint value being the same as the requested fingerprint value is found in the memory 30 or the disk 40, it can be known that the requested tank to be backed up by the client 10 is completely stored in the disk 40. Therefore, the server 20 sends the valid duplicate message to notify the client 10.

On the contrary, when the requested fingerprint value does not exist in the hash tank 60 corresponding to the requested fingerprint value, the server 20 executes Step S500 to Step S800 to determine whether the requested tank is a new tank.

The server 20 searches an addition table 52 in the memory 30 for the requested fingerprint value (Step S500), and then determines whether the requested fingerprint value exists in the addition table 52 (Step S600). The addition table 52 records the stored fingerprint value of the data tank 70 being added. The server 20 can confirm which data tanks 70 is being transmitted and not completely stored in the disk 40 through the addition table 52.

When the requested fingerprint value exists in the addition table 52, which indicates that the corresponding data tank 70 is being added, an invalid duplicate message is sent to the client 10 (Step S700). After receiving the invalid duplicate message, the client 10 can perform a polling or waiting process and re-sends a query request after a predetermined period of time. After receiving the invalid duplicate message, the client 10 can first retain own requested tank for a time, so as to avoid addition failure.

When the requested fingerprint value does not exist in the addition table 52, an addition procedure is executed (Step S800).

Figure 4A:
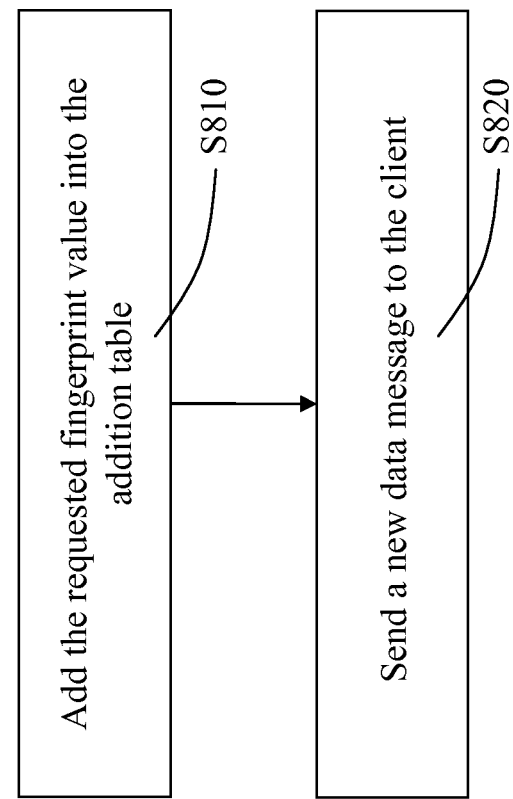
FIG. 4A is a flow chart of an addition procedure according to an embodiment of the present invention.

FIG. 4A is a flow chart of an addition procedure according to an embodiment of the present invention.

Referring to FIG. 4A, the server 20 can first add the requested fingerprint value into the addition table 52 (Step S810), and then sends a new data message to the client 10 (Step S820) to request the client 10 to transport the requested tank.

Figure 4B:
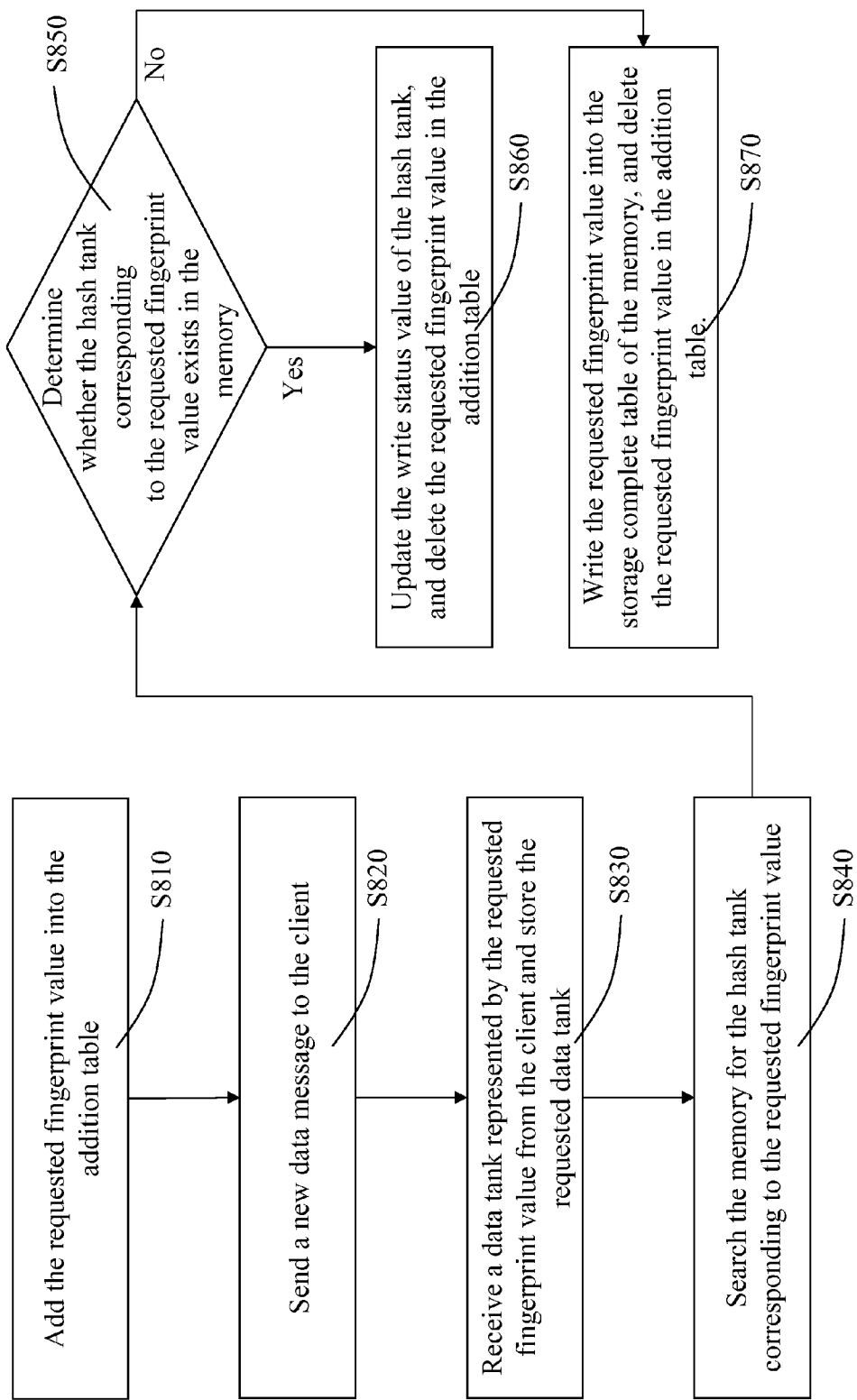
FIG. 4B is a flow chart of an addition procedure according to another embodiment of the present invention.

FIG. 4B is a flow chart of an addition procedure according to an embodiment of the present invention. In this embodiment, the addition procedure can comprise Step S830 to Step S870 after Step S820.

Referring to FIG. 4B, the client 10 sends the requested tank according to the new data message, and the server 20 receives the requested tank represented by the requested fingerprint value from the client 10 and stores the requested tank (Step S830). As stated above, the server 20 searches the memory 20 for the hash tank 60 corresponding to the requested fingerprint value (Step S840), and determines whether the hash tank 60 corresponding to the requested fingerprint value exists in the memory 30 (Step S850).

When the hash tank 60 corresponding to the requested fingerprint value exists in the memory 30, the write status value of the hash tank 60 can be directly updated, and the requested fingerprint value in the addition table 52 is deleted (Step S860). When the hash tank 60 corresponding to the requested fingerprint value does not exist in the memory 30, the requested fingerprint value can be written into the storage complete table 54 of the memory 30, and the requested fingerprint value in the addition table 52 is deleted (Step S870).

Figure 5:
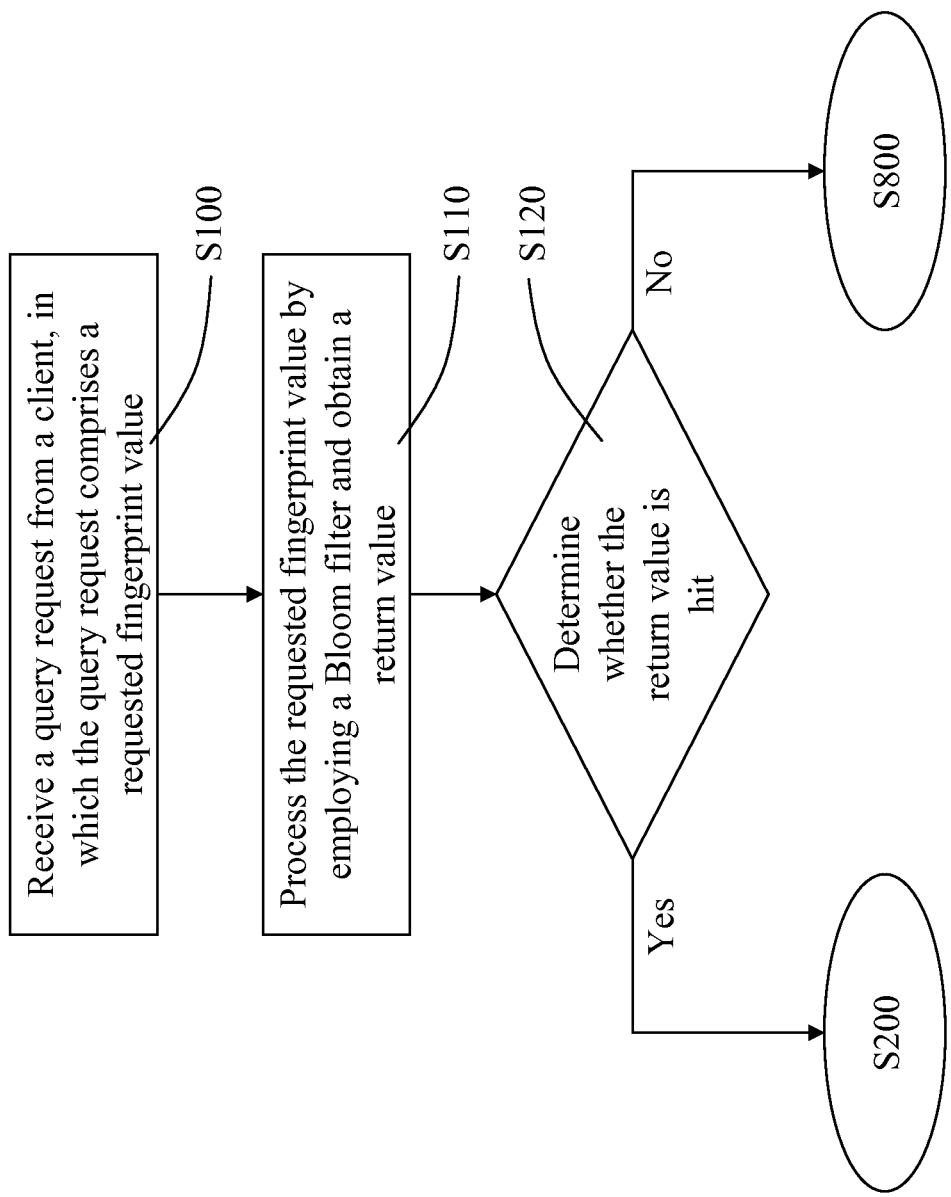
FIG. 5 is a flow chart of a method for processing duplicated data according to another embodiment of the present invention.

FIG. 5 is a flow chart of an addition procedure according to another embodiment of the present invention.

Referring to FIG. 5, in order to reduce the times of the disk IO, after the query request is received, the requested fingerprint value is processed by employing a Bloom filter, and a return value is obtained (Step S110). The Bloom filter can first predict whether the requested tank is a new tank; if the requested tank is the new tank, the return value is hit, which indicates that the requested fingerprint value already exists in the memory 30 or the disk 40. The server 20 determines whether the return value is hit (Step S120). When the return value is hit, Step S200 is executed to determine whether the data is duplicated data; when the return value is miss, Step S800 is executed to add the requested tank.

Moreover, when reading the stored fingerprint value corresponding to the requested fingerprint value in the hash tank 60, the server 20 can compare whether the requested fingerprint value and the stored fingerprint value are the same. If not, hash collision may occur when the stored fingerprint value is recorded. At this time, a hash collision table 56 can be queried to determine whether the stored fingerprint value really corresponding to the requested fingerprint value exists, so as to correctly determine the data duplication.

To sum up, in the method for processing the duplicated data, the addition table is maintained to determine whether invalid duplicated data being added exists, and the storage complete table is maintained to reduce the times of the disk IO. Therefore, the method for processing the duplicated data not only can correctly determine the validity of the duplicated data, but also can be executed rapidly and effectively.

What is claimed is:

1. A method for processing duplicated data, comprising:
  receiving a query request from a client, wherein the query request comprises a requested fingerprint value;
  searching a hash tank corresponding to the requested fingerprint value in a memory for the requested fingerprint value, comprising:
    executing a hash procedure on the requested fingerprint value and obtaining a tank index value;
    searching the memory for the hash tank corresponding to the requested fingerprint value according to the tank index value;
    when the hash tank corresponding to the requested fingerprint value exists in the memory, searching the hash tank corresponding to the requested fingerprint value for the requested fingerprint value; and
    when the hash tank corresponding to the requested fingerprint value does not exist in the memory, executing the following steps:
      loading the hash tank corresponding to the requested fingerprint value into the memory from a disk;
      searching a storage complete table in the memory with the loaded hash tank for the requested fingerprint value; and
      updating a write status value of the hash tank, deleting the requested fingerprint value in the storage complete table, and then searching the hash tank corresponding to the requested fingerprint value for the requested fingerprint value, when the requested fingerprint value exists in the storage complete table; and
  executing the following steps, when the requested fingerprint value does not exist in the hash tank corresponding to the requested fingerprint value:
    searching an addition table in the memory for the requested fingerprint value; and
    sending an invalid duplicate message to the client, when the requested fingerprint value exists in the addition table.

2. The method for processing the duplicated data according to claim 1, further comprising:
  sending a valid duplicate message to the client, when the requested fingerprint value exists in the hash tank.

3. The method for processing the duplicated data according to claim 1, further comprising:
  executing an addition procedure, when requested fingerprint value does not exist in the addition table.

4. The method for processing the duplicated data according to claim 3, wherein the addition procedure comprises:
  adding the requested fingerprint value into the addition table; and
  sending a new data message to the client.

5. The method for processing the duplicated data according to claim 4, wherein the addition procedure further comprises:
  receiving a data tank represented by the requested fingerprint value from the client and storing the data tank;
  searching the memory for the hash tank corresponding to the requested fingerprint value;
  updating the write status value of the hash tank, and deleting the requested fingerprint value in the addition table, when the hash tank corresponding to the requested fingerprint value exists in the memory; and
  writing the requested fingerprint value into a storage complete table, and deleting the requested fingerprint value in the addition table, when the hash tank corresponding to the requested fingerprint value does not exist in the memory.

6. A method for processing duplicated data, comprising:
  receiving a query request from a client, wherein the query request comprises a requested fingerprint value;
  processing the requested fingerprint value by employing a Bloom filter and obtaining a return value; and
  executing the following steps, when the return value is hit:

searching a hash tank corresponding to the requested fingerprint value in a memory for the requested fingerprint value, comprising:

executing a hash procedure on the requested fingerprint value and obtaining a tank index value;

searching the memory for the hash tank corresponding to the requested fingerprint value according to the tank index value;

when the hash tank corresponding to the requested fingerprint value exists in the memory, searching the hash tank corresponding to the requested fingerprint value for the requested fingerprint value; and when the hash tank corresponding to the requested fingerprint value does not exist in the memory, executing the following steps:

loading the hash tank corresponding to the requested fingerprint value into the memory from a disk;

searching a storage complete table in the memory with the loaded hash tank for the requested fingerprint value; and updating a write status value of the hash tank, deleting the requested fingerprint value in the storage complete table, and then searching the hash tank corresponding to the requested fingerprint value for the requested fingerprint value, when the requested fingerprint value exists in the storage complete table; and executing the following steps, when the requested fingerprint value does not exist in the hash tank corresponding to the requested fingerprint value:

searching an addition table in the memory for the requested fingerprint value; and sending an invalid duplicate message to the client, when the requested fingerprint value exists in the addition table.

7. The method for processing the duplicated data according to claim 6, further comprising:

executing an addition procedure, when the return value is miss.

* * * * *